United States Patent
Garay

(10) Patent No.: US 11,631,045 B2
(45) Date of Patent: Apr. 18, 2023

(54) SCHEDULING PRODUCTION OF PACKAGED DAIRY PRODUCTS IN EXISTING PRODUCTION PLANTS BY SIMULATION

(71) Applicant: Tetra Laval Holdings & Finance S.A., Pully (CH)

(72) Inventor: Ruben Garay, Veberöd (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 65 days.

(21) Appl. No.: 17/058,885

(22) PCT Filed: May 29, 2019

(86) PCT No.: PCT/EP2019/064123
§ 371 (c)(1),
(2) Date: Nov. 25, 2020

(87) PCT Pub. No.: WO2019/229204
PCT Pub. Date: Dec. 5, 2019

(65) Prior Publication Data
US 2021/0365880 A1  Nov. 25, 2021

(30) Foreign Application Priority Data
May 31, 2018  (EP) ..................... 18175288

(51) Int. Cl.
*G06Q 10/08* (2012.01)
*G06Q 10/04* (2012.01)
(Continued)

(52) U.S. Cl.
CPC ......... *G06Q 10/0833* (2013.01); *G06Q 10/04* (2013.01); *G06Q 10/06312* (2013.01);
(Continued)

(58) Field of Classification Search
CPC ............... G06Q 10/0833; G06Q 10/04; G06Q 10/06312; G06Q 10/06314; G06Q 10/0875; G06Q 50/28
(Continued)

(56) References Cited

U.S. PATENT DOCUMENTS

| 2003/0220828 | A1* | 11/2003 | Hwang | C08F 2/00 |
| | | | | 700/197 |
| 2012/0083914 | A1* | 4/2012 | Kocis | G06F 30/20 |
| | | | | 700/100 |
| 2014/0116341 | A1* | 5/2014 | Kopic | A01J 99/00 |
| | | | | 119/14.02 |

FOREIGN PATENT DOCUMENTS

| DE | 102006004413 A1 * | 8/2007 | ....... G05B 19/41865 |
| EP | 2507672 A1 * | 10/2012 | ............. G05B 13/04 |
(Continued)

OTHER PUBLICATIONS

M.A. Deshmukh, S.S. Chopde, S.D. Kalyankar and V.D. Kele "Computer Applications in Dairy Industry" Oriental Journal of Computer Science & Technology, ISSN: 0974-6471 Apr. 2015, vol. 8, No. (1):pp. 24-34, 2004. (Year: 2004).*

(Continued)

*Primary Examiner* — Abdallah A El-Hage Hassan
(74) *Attorney, Agent, or Firm* — Knobbe, Martens, Olson & Bear, LLP

(57) ABSTRACT

A computer device implements a method of scheduling production of packaged dairy products in a production plant by simulation. The method obtains a production target for dairy products to be produced and packaged in the production plant, recipes for production of the packaged dairy products, where each recipe defines ingredients and recipe activities, and production unit data that specifies existing production units and available fluid paths in the production plant and associates the existing production units with unit (Continued)

activities and production capacities. The method further performs the simulation by generating, as a function of the recipes and the production unit data, time schedules of recipe activities performed at least partly by one or more combinations of the existing production units to achieve the production target data, and evaluating the time schedules for selection of at least one time schedule for the production plant.

19 Claims, 7 Drawing Sheets

(51) Int. Cl.
  *G06Q 10/06* (2012.01)
  *G06Q 50/28* (2012.01)
  *G06Q 10/0833* (2023.01)
  *G06Q 10/0875* (2023.01)
  *G06Q 10/0631* (2023.01)

(52) U.S. Cl.
  CPC ... *G06Q 10/06314* (2013.01); *G06Q 10/0875* (2013.01); *G06Q 50/28* (2013.01)

(58) Field of Classification Search
  USPC .................................................. 705/7.24
  See application file for complete search history.

(56) References Cited

FOREIGN PATENT DOCUMENTS

WO    WO 2000/28451         5/2000
WO       WO-0028451 A2  *  5/2000   ............ G06Q 10/06

OTHER PUBLICATIONS

Sundaram Gunasekaran, "Computerized Automation Controls in Dairy Processing" University of Wisconsin-Madison, Madison, Wisconsin, 1997 (Year: 1997).*
Extended European Search Report issued in Application No. 18175288.2 dated Sep. 10, 2018.
International Search Report and Written Opinion issued in Application No. PCT/EP2019/064123 dated Jul. 12, 2019.

* cited by examiner

SCHEDULING PRODUCTION OF PACKAGED DAIRY PRODUCTS IN EXISTING PRODUCTION PLANTS BY SIMULATION

TECHNICAL FIELD

The invention generally relates to production of dairy products, and in particular to a simulation tool for time scheduling production of packaged dairy products in an existing production plant.

BACKGROUND ART

Time scheduling, also known as Production Time Scheduling, PTS, is concerned with efforts to ensure that resources are well utilized in a production plant. Generally, plants for production and packaging of dairy products are designed to be capable of producing a large number of different types of packaged dairy products, both with respect to the type of packages and the type of dairy products, where the types and/or volumes of packaged dairy products to be produced may differ over time. The plant may have multiple production lines, and a large number of process constraints may exist due to varied capabilities of the production lines and processing requirements. Some products may be produced on more than one production line and some processes may require sharing of production equipment. Some products may have precedence constraints, and products that have similar production conditions may be scheduled for production consecutively. Further, production of packaged dairy products may involve both batch production and continuous production, which makes time scheduling even more challenging.

Currently, time scheduling in an existing plant for production of packaged dairy products, e.g. for a day or week, is performed by a process engineer making manual calculations based on experience and knowledge about the production processes and the production equipment in the plant. Even if the process engineer has access to computerized planning tools that graphically visualize the time allocation of the production equipment and allows the process engineer to modify the time allocation, the planning is still based on trial-and-error and requires significant experience of the process engineer. Also, there are factors relevant for the production that are not taken into account by the process engineer. To reduce complexity, time scheduling is often limited to a subset of the plant. It is also common that previous time schedules are simply re-used and updated, that the scheduling is simplified or that excessive and costly margins are used.

Time scheduling of production in an existing plant, if performed thoroughly, is thus a time consuming and labor intensive task. The outcome of the time scheduling will typically differ for the same input data depending on the experience of the process engineer. It is not unlikely that the time scheduling results in a suboptimal or even poor utilization of resources at the plant. The time scheduling may also erroneously indicate a need to invest in an update of the plant with further processing equipment in order to meet a production goal. Further, to the extent that the plant actually needs to be updated, it is difficult for the process engineer to determine how to update the plant so as to improve the output of the plant as a whole while minimizing investment cost.

With an increasing emphasis on the multiple objectives of on-time shipment, low inventory and production quality, there is a need for a scheduling tool to improve production time scheduling for better plant performance, taking all or at least more factors relevant for the production time scheduling into account.

SUMMARY

It is an object of the invention to at least partly overcome one or more limitations of the prior art.

One such object is to improve and/or facilitate scheduling of production of packaged dairy products in an existing production plant.

One or more of these objects, as well as further objects that may appear from the description below, are at least partly achieved by a method, a computer-readable medium and a device according to the independent claims, embodiments thereof being defined by the dependent claims.

A first aspect of the invention is a computer-implemented method of scheduling production of packaged dairy products in a production plant by simulation. The method comprises: obtaining target production data for a plurality of dairy products to be produced and packaged in the production plant to form the packaged dairy products; obtaining recipes for production of the packaged dairy products, wherein each recipe defines a set of ingredients and sequence of recipe activities for producing a respective packaged dairy product from the set of ingredients; obtaining production unit data that specifies existing production units in the production plant and available fluid paths between the existing production units, the production unit data further associating each existing production unit with one or more unit activities and a production capacity; and simulating the production of the packaged dairy products in the production plant to determine at least one time schedule that achieves the target production data. The simulating comprises: generating, as a function of the recipes and the production unit data, time schedules of recipe activities that are performed at least partly by one or more combinations of the existing production units to achieve the target production data; evaluating the time schedules for selection of said at least one time schedule; and outputting said at least one time schedule.

A second aspect of the invention is a computer-readable medium comprising computer instructions which, when executed by a processing device, cause the processing device to perform the method of the first aspects or any of its embodiments.

A third aspect of the invention is a device for scheduling production of packaged dairy products in a production plant, the device being configured to perform the method of the first aspect of any of its embodiments.

Still other objectives, as well as features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention. As used herein, the term "and/or" includes any and all combinations of one or more of the associated listed items. As used herein, a "set" of items is intended to imply a provision of one or more items. Thus, a "set of ingredients" may designate a single ingredient or multiple ingredients. Likewise, a "set of production units" may designate a single production unit or multiple production units. As used herein, "dairy product" refers to a food product that has produced from a substance that contains milk from mammals, primarily but not exclusively cattle, or milk from plant sources. The substance may be made from fresh milk and/or milk powder.

Well-known functions or constructions may not be described in detail for brevity and/or clarity. Unless otherwise defined, all terms (including technical and scientific terms) used herein have the same meaning as commonly understood by one of ordinary skill in the art to which this invention belongs.

Like reference signs refer to like elements throughout.

Figure 1:
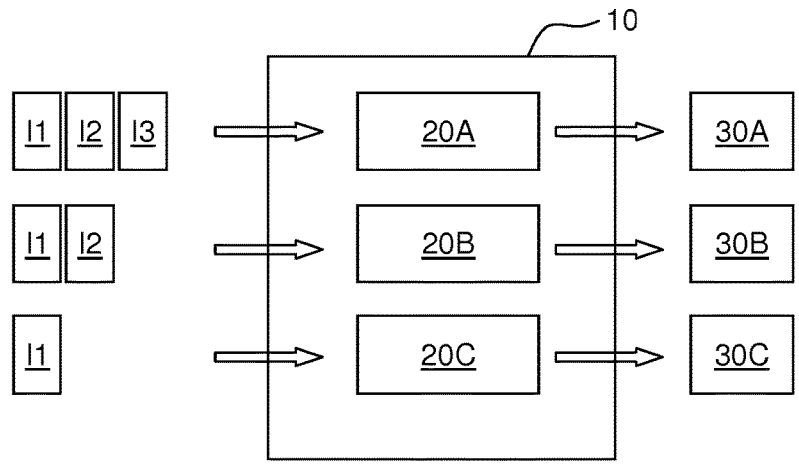
FIG. 1 schematically illustrates processes for producing packaged dairy products from sets of ingredients in a production plant.

FIG. 1 is a schematic overview of a production plant 10 which is arranged to produce three different packaged dairy products 30A, 30B, 30C from ingredients I1, I2, I3, by use of three production processes 20A, 20B, 20C that are performed by the production equipment in the plant 10. The production processes 20A, 20B, 20C and the ingredients I1, I2, I3 are defined by recipes for the respective dairy product 30A-30C. To maximize production throughput, it would be desirable to perform the processes 20A-20C in parallel by use of different production equipment. However, it is generally not possible, for reasons of economy, to dimension a plant for parallel production of all possible types of packaged dairy products. Thus, the processes 20A-20C generally have to at least partly share the existing production equipment in the plant. The task of allocating activities of the respective process 20A-20C to the production equipment in the plant 10 is denoted time scheduling.

Figure 2:
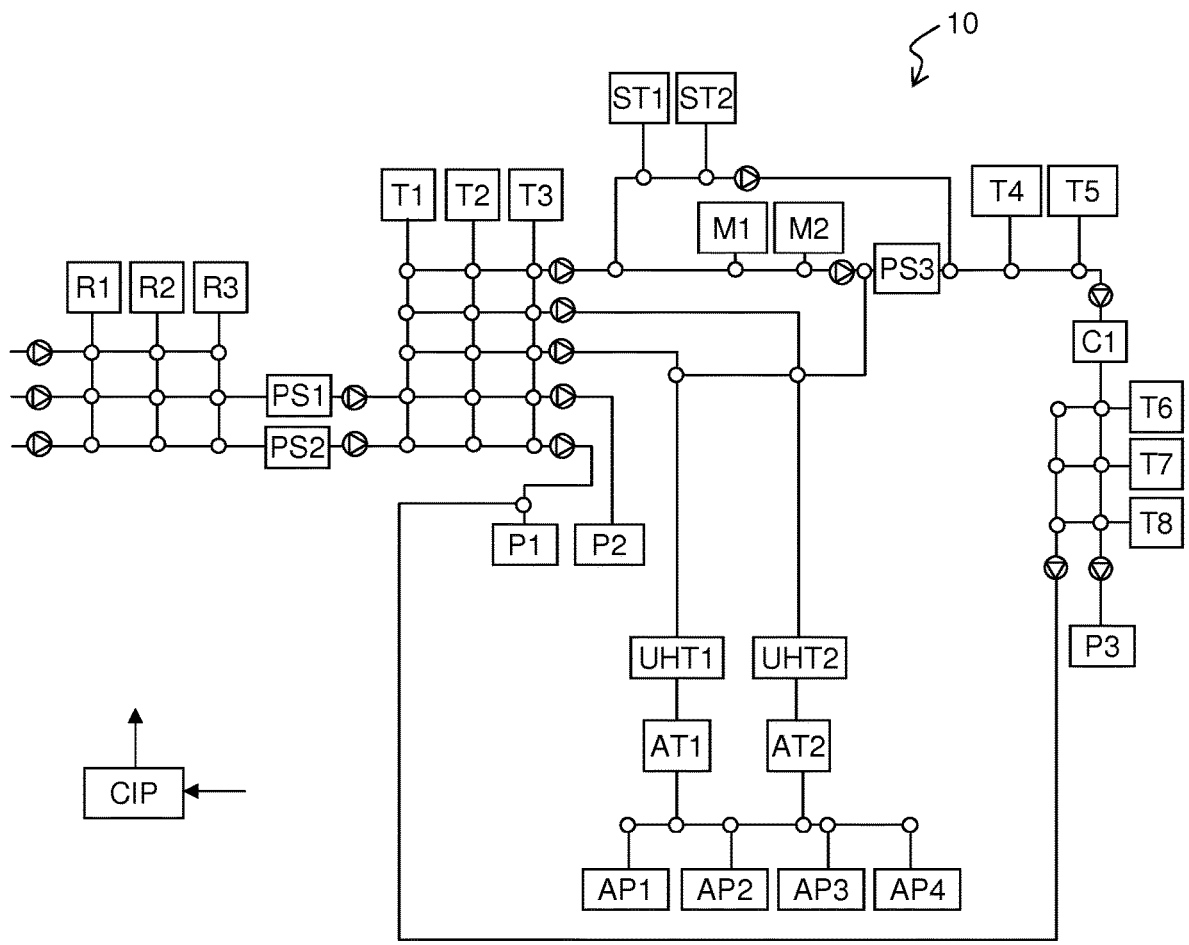
FIG. 2 is a block flow diagram of a production plant for packaged dairy products.

FIG. 2 shows a generalized example of a plant 10 for production of packaged dairy products. In FIG. 2, open squares represent production equipment, denoted "production units" or PUs in the following, and solid lines that extend between the PUs indicate fluid conduits (fluid paths). The fluid conduits may be permanently arranged to extend as shown, but it is also conceivable that fluid conduits may be added and/or moved by manual operations by the operating staff of the plant 10. The fluid conduits are schematically illustrated and each typically comprises multiple fluid paths that allow one or more fluids to pass simultaneously and separated from each other in opposite directions in the fluid conduit. Further, conventional pump symbols indicate provision of fluid pumps along the fluid conduits, and open circles indicate flow controlling valves. The PUs of the illustrated plant 10 include milk reception units R1-R3, which each may include a tank as well as equipment for further processing, such as pre-heating, de-aeration, homogenization, etc. Pasteurizers PS1-PS3 are arranged for heat treatment. Tanks T1-T8 are distributed throughout the plant 10 for storage of ingredients, intermediate products or final dairy products. Starter tanks ST1, ST2 are provided to contain and dispense a starter culture for use in production of fermented dairy products, such as yoghurt. Mixing devices M1, M2 are provided to enable admixing of dry or liquid ingredients, and a heat exchanger C1 is provided for cooling or heating. Filling machines or packaging lines P1-P3 are provided to fill dairy products into packages, e.g. of carton and/or plastic, which may be sealed for subsequent distribution. The plant 10 also comprises an aseptic (sterile) production section, which comprises units UHT1, UHT2 for ultra-high temperature processing, also known as ultra-heat treatment or ultra-pasteurization in the art, aseptic tanks AT1, AT2 for storage of sterilized dairy products, and aseptic filling machines or packaging lines AP1-AP4. All of the PUs shown in FIG. 2 are well-known to the skilled person, who also realizes that the plant 10 may comprise further PUs, including but not limited to separators, heaters, homogenizers, and package distribution equipment.

FIG. 2 also indicates that the plant 10 comprises a cleaning unit CIP, e.g. a conventional clean-in-place system which is connected for fluid communication with fluid conduits and/or PUs in the plant 10 to enable circulation of a cleaning fluid. The capability to clean the production equipment is a strict requirement in production of dairy products and is set by regulatory authorities. However, the need for cleaning may differ depending of the dairy product being produced, the time since last cleaning, etc. Generally, a plant 10 comprises one or only a few CIPs, and cleaning typically needs to be performed sequentially among the PUs and fluid conduits of the plant 10. Thus, the scheduling of the CIP(s) may have a significant impact on the duration of the production processes 20A-20C in the plant 10 (FIG. 1).

Figure 3A:
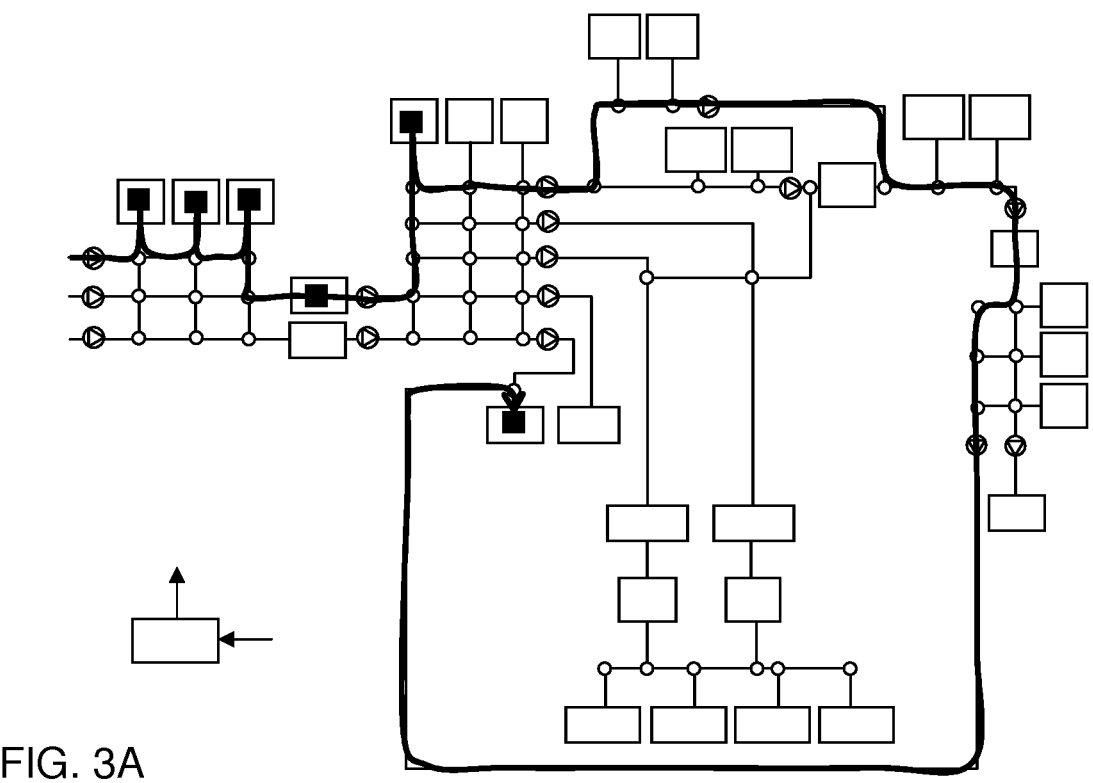
FIGS. 3A-3C illustrate material flows in the plant of FIG. 2 for production of packages of three different dairy products.
Figure 3B:
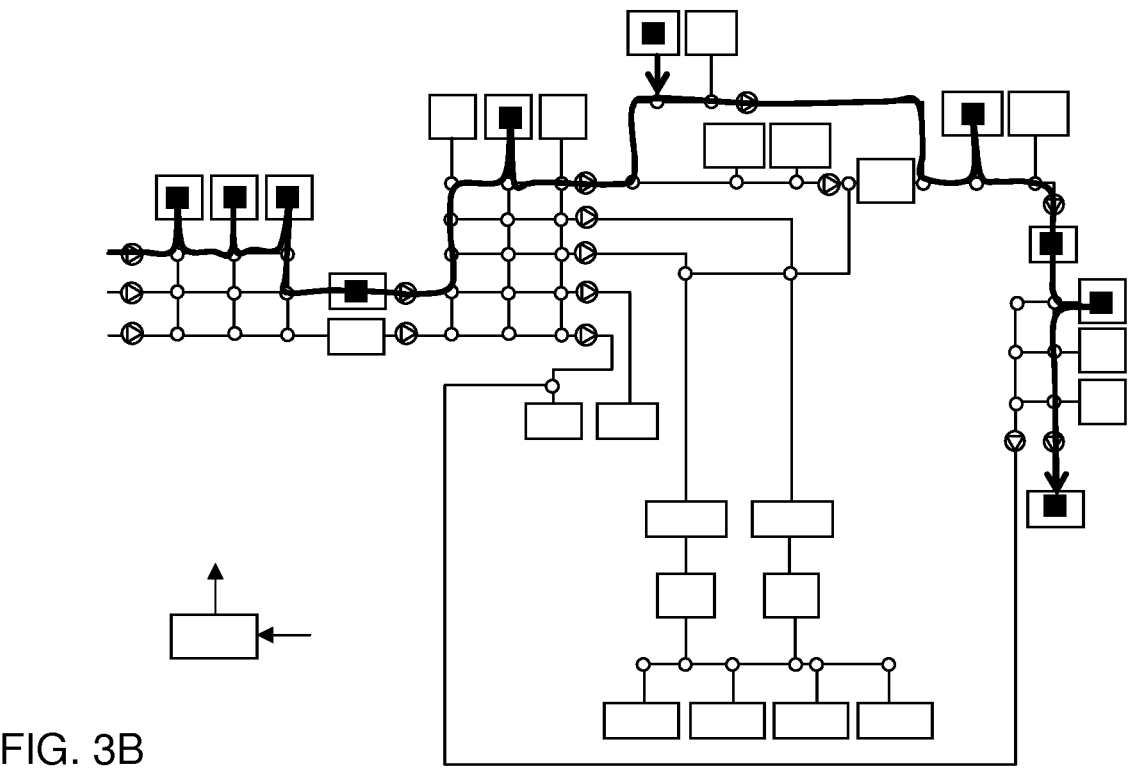
Figure 3C:
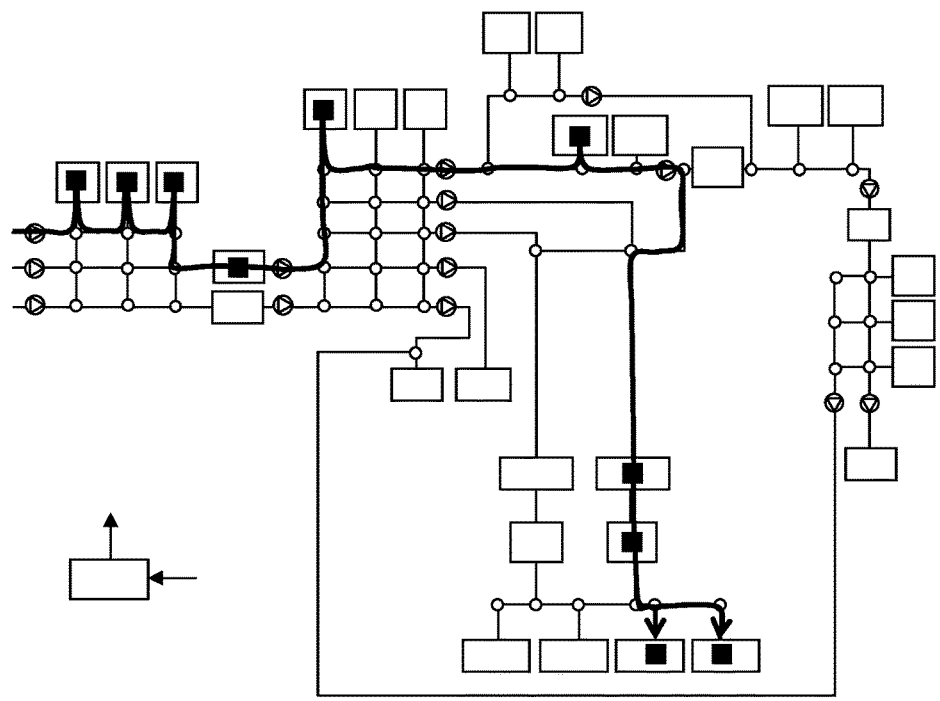

FIGS. 3A-3C show examples of how material may flow through the plant 10 of FIG. 2 in accordance with a time scheduling, where the thick arrow line indicates the material flow and the filled squares indicate the PUs that are operated for processing.

FIG. 3A illustrates the material flow for production of packaged standard milk. A delivery of raw milk is pumped into milk reception units R1-R3, whereupon the milk is subjected to heat treatment when pumped through the pasteurizer PS1 into storage tank T1. From tank T1, the treated milk is pumped to the filling machine P1 which is operated to produce packages of milk. The combination of PUs indicated by filled squares in FIG. 3A may be seen to perform the production process 20C in FIG. 1 to produce packages of milk 30C based on raw milk I1.

FIG. 3B illustrates the material flow for production of packaged yoghurt. A delivery of raw milk is pumped into milk reception units R1-R3, whereupon the milk is subjected to heat treatment when pumped through the pasteurizer PS1 into storage tank T2. From tank T2, the treated milk is pumped past the starter tank ST1 which is operated to add a starter culture to the milk. The mixture of milk and start culture is pumped into tank T4 for fermentation (incubation) during a predefined time period, whereupon the resulting yoghurt is cooled when pumped through the heat exchanger C1 into tank T6 for intermediate storage. From tank T6, the yoghurt is pumped to filling machine P3 which is operated to produce packages of yoghurt. The combination of PUs indicated by filled squares in FIG. 3B may be seen to perform the production process 20B in FIG. 1 to produce packages of yoghurt 30B based on raw milk I1 and starter culture I2.

FIG. 3C illustrates the material flow for production of chocolate milk in aseptic packages. A delivery of raw milk is pumped into milk reception units R1-R3, whereupon the milk is subjected to heat treatment when pumped through the pasteurizer PS1 into storage tank T1. From tank T1, the treated milk is pumped through the mixing unit M1 which is operated to mix chocolate powder and sugar into the milk. The resulting chocolate milk is pumped through the aseptic heat treatment unit UHT2 and into aseptic tank AP2 for intermediate storage. From aseptic tank AP2, the sterilized chocolate milk is pumped to aseptic filling machines AP3, AP4 which are operated in parallel to produce sterile packages of chocolate milk. The combination of PUs indicated by filled squares in FIG. 3C may be seen to perform the production process 20A in FIG. 1 to produce packages of chocolate milk 30A based on raw milk I1, chocolate powder I2 and sugar I3.

Figure 4:
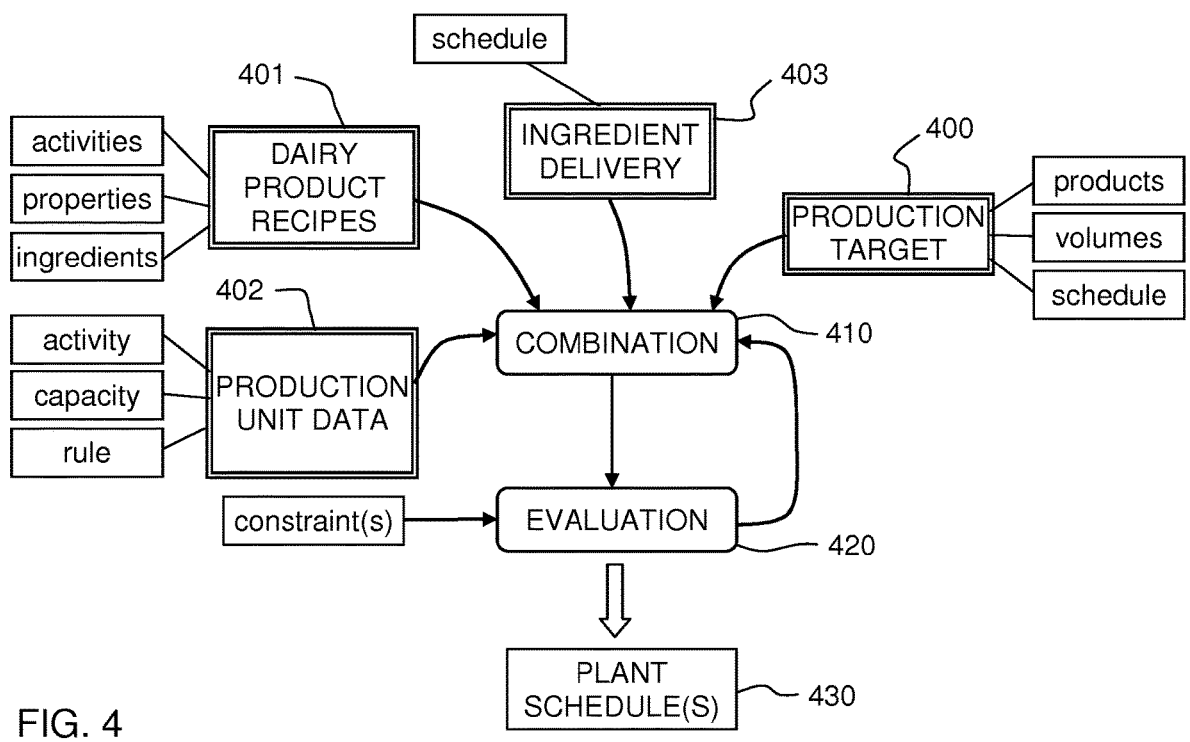
FIG. 4 is an overview of an embodiment of a method for scheduling production of packaged dairy products in an existing production plant.

FIG. 4 is an overview of an embodiment for scheduling production, e.g. in the plant 10 of FIG. 2. A production scheduling process may also be denoted an engineering design process, a simulation process or a configuration process. FIG. 4 may be seen to represent input data 400-403 for the scheduling, blocks 410, 420 that are configured to perform a scheduling process, and output data 430 that is generated by the scheduling process.

The input data comprises target production data ("production target") 400 for the plant. The production target 400 may specify the dairy product packages ("products") and the production volumes ("volumes") to be produced for a specific time period, e.g. one or more days or weeks, where the respective dairy product package may be defined by type of dairy product and type of package. Such a production target 400 is also known as an SKU list (Stock Keeping Unit) in the art. As indicated in FIG. 4, the production target 400 may also include a production schedule ("schedule") for the dairy product packages, i.e. the amount to be produced of a specific packaged dairy product as a function of time. The input data further comprises recipes 401 for the dairy products to be produced. Each recipe defines a sequence of recipe activities ("activities"), a set of ingredients ("ingredients") and may also specify a property of one or more activities, e.g. a minimum and/or maximum duration, a temperature interval, a pressure, a pumping speed, etc. The input data further comprises production unit data 402 that specifies the existing PUs in the plant and the available fluid connections between the existing PUs. The production unit data 402 associates each PU with one or more unit activities ("activity") and one or more production capacities ("capacity"), e.g. given as volume, volume flow rate, package production rate, etc. For example, a tank may be associated with one or more of a total capacity, a maximum filling rate and a maximum emptying rate. The unit activities are defined to correspond to the recipe activities, so that each recipe activity may be matched to one or more unit activities. As indicated in FIG. 4, the production unit data 402 may also associate one or more rules ("rule") with a PU. The rule(s) may be directed to the cleaning process and, e.g., specify one or more of: a duration of a short cleaning process ("Short CIP"), a duration of an extended cleaning process ("Full CIP"), the number of consecutive Short CIPs that are allowed before a Full CIP is required, a first time limit for non-use of a PU without need for cleaning (i.e. a CIP needs to be performed if the PU has not been used for a time period that exceeds the first time limit), a second time limit for use of a PU without need for cleaning (i.e. a CIP needs to be performed whenever the second time limit is exceeded), and a need to perform a CIP when usage of a PU ends. Alternatively or additionally, the rule(s) may be directed to other features of the PU. For example, a rule for a tank may specify a volume or fraction of the tank that needs to be filled before emptying of the tank may be started ("minimum volume before emptying"), a rule for a heat treatment unit may specify a maximum time that water may circulate through the unit ("circulation limit"), a rule for any PU may specify a nominal time required for an operator to set up the PU ("preparation event duration"), a rule for any PU may specify a nominal time required for daily care ("daily care duration"), etc. The input data may also comprise delivery data 403 for the ingredients, including a delivery schedule for the delivery of one or more ingredients. Such a delivery schedule may designate, as a function of time, the amount of a specific ingredient that will be delivered and needs to be handled at the plant.

As indicated in FIG. 4, a combination block 410 is arranged to process the input data 400-403 so as to generate time schedules of recipe activities that are performed by one or more combinations of the existing PUs in the plant to achieve the production target 400. An evaluation block 420 is arranged to evaluate the time schedules generated by block 410 for fulfillment of at least one evaluation constraint. As indicated in FIG. 4, the combination and evaluation blocks 410, 420 may implement an iterative optimization process, where the evaluation block 420 provides information about the outcome of the evaluation to the combination block 410, thereby enabling the combination block 410 to systematically generate time schedules for the purpose of reducing the time for the evaluation block 420 to find one or more acceptable time schedules. Such an iterative optimization process may be based on any suitable optimization model. Examples of the scheduling process performed by blocks 410, 420 are given further below with reference to FIGS. 6A-6B.

The output data of the scheduling process is one or more proposed time schedules for the plant ("plant schedules"), where each proposed time schedule includes a time allocation of the existing PUs, or a subset thereof, to implement the respective production process (cf. 20A-20C in FIG. 1) so as to achieve the production target 400, where the production process is given by the recipes 401 and the existing PUs are given by the production unit data 402. The proposed time schedule(s) may be presented to a user, e.g. a process engineer, for further assessment of relevance and feasibility, or be directly provided as a basis for setting up the plant for production. The output data may also include further production-related data for each time schedule, such as a projected time to achieve the production target, a cost, and a consumption of one or more utilities such as water, energy, steam (for heat treatment and/or cleaning), cleaning agent, cooling fluid, etc.

Figure 5:
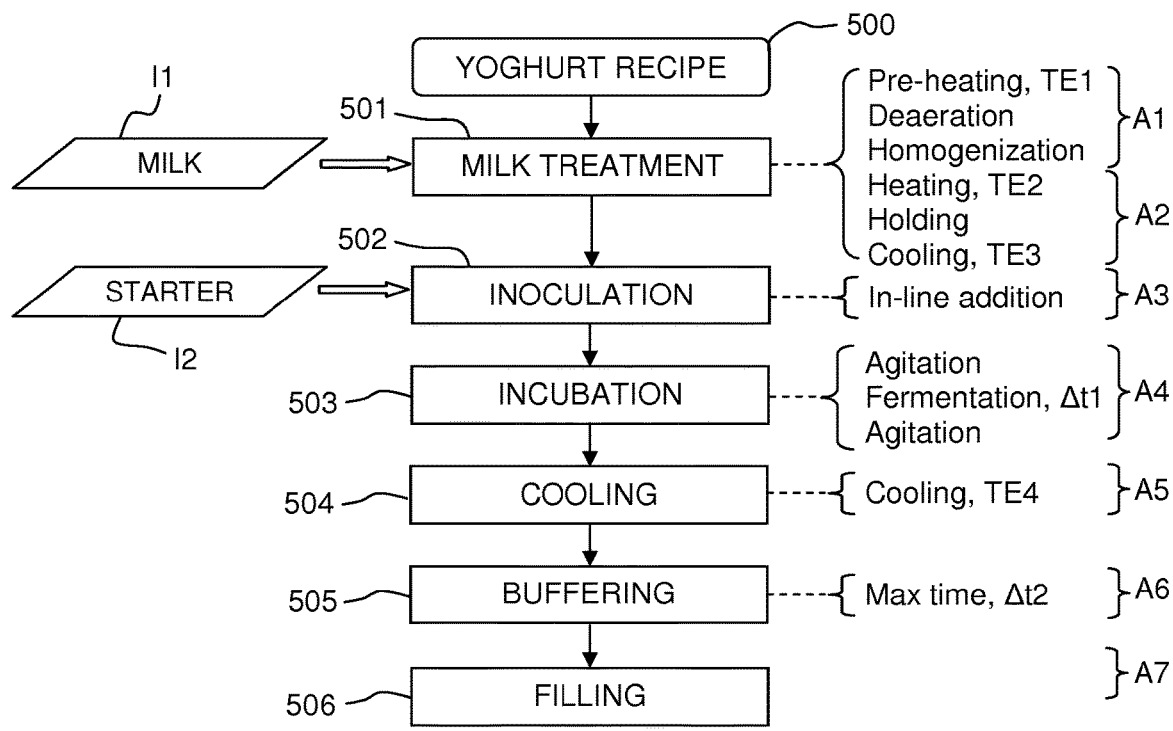
FIG. 5 shows a sequence of activities corresponding to a recipe for production of yoghurt.

FIG. 5 illustrates, in the form of a flow chart, an exemplifying recipe 500 for production of yoghurt. The illustrated recipe 500 comprises a sequence of processing steps 501-506 for producing yoghurt-containing packages. The recipe 500 also defines two ingredients, milk I1 and starter culture I2. Some processing steps are associated with specific properties, and some processing steps comprise a sequence of sub-steps, some of which are associated with specific properties. Specifically, the recipe 500 includes a milk treatment step 501, in which milk I1 is received and subjected to a treatment comprising a sequence of sub-steps: pre-heating, de-aeration, homogenization, heating, holding, and cooling. The sub-steps pre-heating, heating and cooling are associated with a respective property TE1, TE2, TE3 that indicates the temperature to be used in the respective sub-step. The milk treatment step 501 is followed by an inoculation step 502, in which the starter culture I2 is added to the milk by in-line addition. Then follows an incubation step 503, in which the mixture of milk and starter culture is subjected to agitation, fermentation, and agitation. The fermentation sub-step is associated with a property Δt1 that indicates its duration. A subsequent cooling step 504 reduces the temperature of the fermented mixture to TE4, and whereupon the resulting yoghurt is buffered 505 for a time period not to exceed Δt2. The recipe 500 is concluded by a step 506 of filling the yoghurt into packages.

In the illustrated example, the recipe 500 includes a sequence of recipe activities A1-A7, which are defined to correspond to activities ("unit activities") that may be performed by existing PUs in the plant. For the plant 10 in FIG. 2, activity A1 may be performed by receiving units R1-R3, activity A2 may be performed by pasteurizers PS1-PS2, activity A3 may be performed by starter tanks ST1-ST2, activity A4 may be performed by tanks T1-T8, activity A5 may be performed by heat exchanger (cooling unit) C1, activity A6 may be performed by tanks T1-T8, and activity A7 may be performed by filling units P1-P3.

Thus, each recipe may be structured into a set of ingredients and a sequence of recipe activities, where any of the recipe activities may be associated with one or more properties.

Figure 6A:
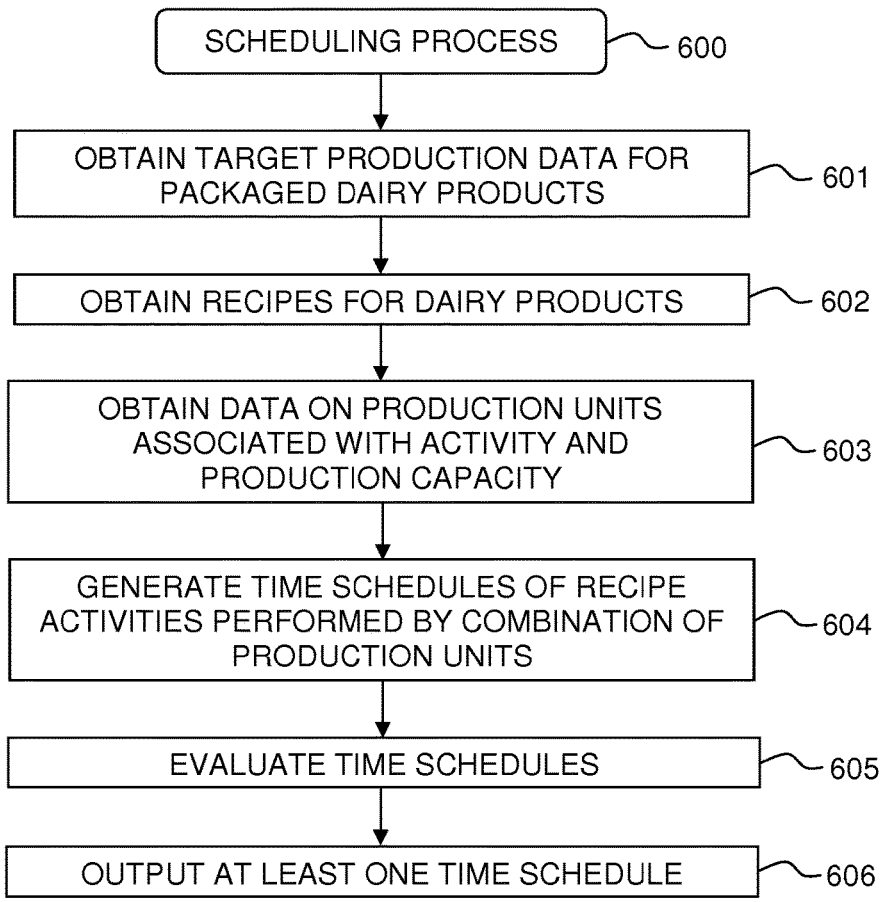
FIG. 6A is a flow chart of a scheduling process in accordance with an embodiment.

FIG. 6A is a flow chart of a scheduling process 600 according to an embodiment. The process 600 involves a set of data collection steps 601-603 for obtaining input data. Step 601 obtains the target production data ("production target" 400 in FIG. 4) for a plurality of dairy products to be produced and packaged in the production plant, and step 602 obtains diary product recipes (401 in FIG. 4) for the dairy products to be produced according to the production target 400. Step 603 obtains the above-described production unit data (402 in FIG. 4). Any one of steps 601-603 may involve instructing an operator, via a user interface (cf. 1006 in FIG. 10), to manually enter input data and/or select input data from a database. It is also conceivable that any one of steps 601-603 automatically retrieves input data from the database. For example, steps 602 and 603 may automatically retrieve recipes 401 from a database based on a production target 400 entered/selected by the operator, and automatically retrieve production unit data 402 based on the recipes 401.

The process 600 also comprises processing steps 604-605, which may be implemented by combination block 410 and evaluation block 420 in FIG. 4. Step 604 generates, as a function of the recipes 401 and the production unit data 402, candidate time schedules for recipe activities performed by one or more combinations of the existing PUs to achieve or meet the production target 400. Step 605 evaluates the candidate time schedules for selection of at least one proposed time schedule. Finally, step 606 outputs the proposed time schedule(s) selected by step 605. Steps 604-606 may be seen to represent a simulation of the production of packaged dairy products in the production plant to determine at least one proposed time schedule that achieves the production target 400.

If the production target 400 comprises a production schedule, step 604 may also account for the production schedule when generating the candidate time schedules, by ensuring that the respective dairy product package is produced in correspondence with the production schedule. Further, the process 600 may include a step of obtaining an ingredient delivery schedule (403 in FIG. 4) and step 604 may account for the ingredient delivery schedule 403 when generating the candidate time schedules, by adapting the timing of recipe activities to the availability of ingredient(s).

The scheduling process 600, when implemented by a computer device, provides a simulation tool that enables a systematic analysis of the capabilities of an existing production plant to meet a production target and outputs one or more proposed time schedules that meet or is closest to the production target. The tool will greatly facilitate the task of scheduling production in the production plant and may also result in significantly improved time scheduling, e.g. if steps 604-605 are implemented as an iterative optimization process which is configured to find the best time schedule(s) according to one or more evaluation constraints.

Figure 6B:
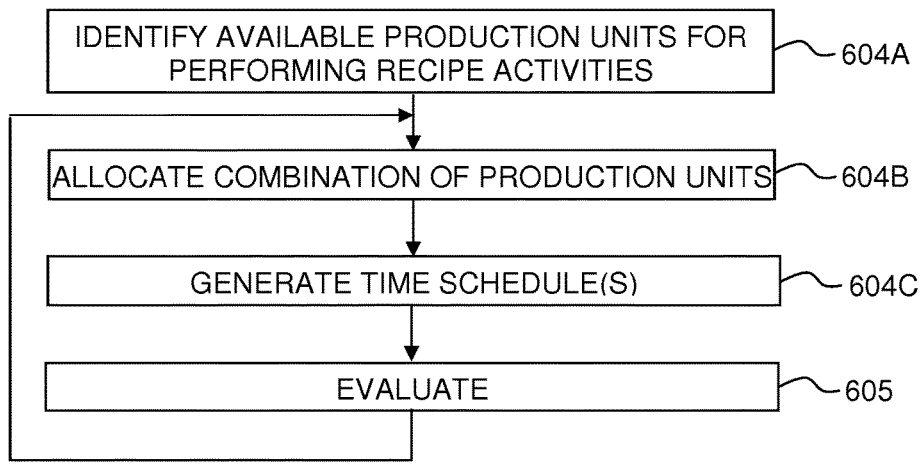
FIG. 6B is a flow chart of a part of a scheduling process in accordance with a further embodiment.

FIG. 6B is a flow chart of steps 604-605 in FIG. 6A in accordance with a further embodiment. Steps 604A-604C correspond to step 604 in FIG. 6A. Step 604A identifies the available PUs for performing the recipe activities, e.g. by comparing the recipe activities of the recipes 401 to the unit activities of the existing PUs. Step 604A may thereby include any existing PU that is associated with a unit activity that matches a recipe activity in a set of available PUs for performing the recipe activities ("available set"). Step 604B allocates, based on the available fluid paths and the production capacity associated with the respective PU in the available set, a combination of the existing PUs. To perform the allocation, step 604B may perform a backwards calculation of the required production capacity of the respective PU by a mass balance based on the products and volumes to be produced according to the production target 400, as well as the production schedule, if specified. Step 604C generates one or more candidate time schedules for the allocated combination of PUs to meet the production target, and step 605 evaluates the candidate time schedules. As shown in FIG. 6B, the process may then return to step 604B to allocate a new combination of existing PUs, based on the outcome of the evaluation in step 605. Thereby, step 604B may be adapted based on the outcome of one or more previously allocated combinations of existing PUs and the corresponding candidate time schedule(s) generated for such combination(s). This iterative approach allows the scheduling process to systematically search for optimal time schedules.

In one embodiment, step 604C accounts for the need for cleaning of PUs and/or fluid conduits when generating the candidate time schedules. As noted above, intermittent cleaning is mandatory in plants for production of dairy products and access to a cleaning unit (CIP) is often a bottleneck for the time scheduling. The scheduling process 600 may thus include a step of obtaining cleaning unit data that specifies fluid paths between the at least one CIP in the plant and the existing PUs, as well as cleaning activities for each existing PU, thereby allowing step 604C to generate the candidate time schedules as a function of the cleaning unit data. The cleaning unit data may be at least partly obtained by step 603, to the extent that the cleaning activities are defined by the rules included in the production unit data 402, as exemplified above with reference to FIG. 4. Alternatively or additionally, at least part of the cleaning unit data may be obtained in a further data collection step (not shown).

Figure 7A:
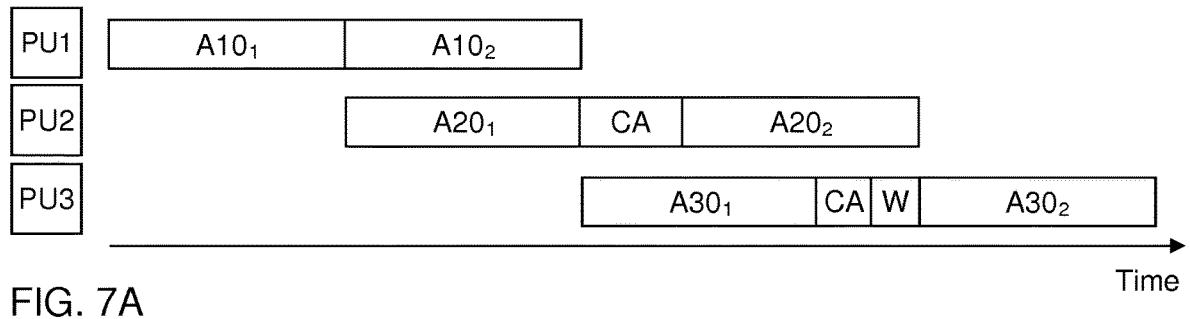
FIGS. 7A-7B illustrate changes in time schedules depending on the order of material supply to production units.
Figure 7B:
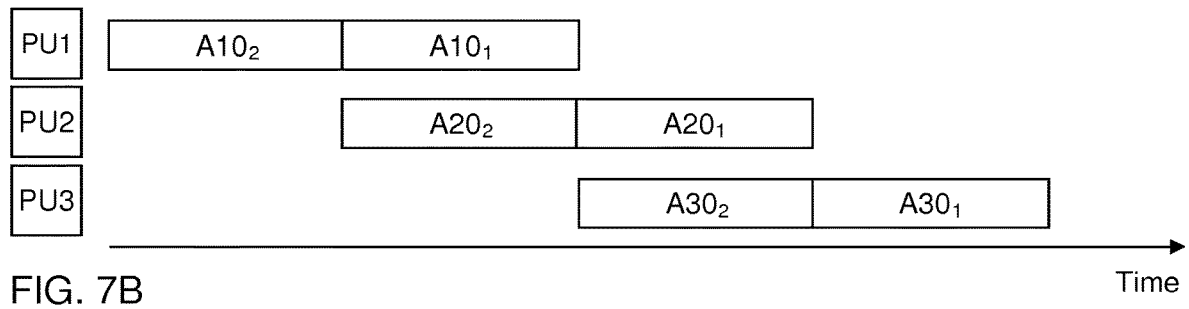

Generally, step 604/604C may take into account rules included in the production unit data 402 when generating the time schedules. To give an example, consider a cleaning rule that stipulates that the PU must be cleaned after each handling of a certain dairy product or intermediate product, unless the same dairy product or intermediate product is handled next, and that the PU otherwise is to be cleaned in accordance with a default cleaning rule (e.g. Short CIP and/or Full CIP as described above). FIGS. 7A-7B illustrate the timing of recipe activities A10, A20, A30 performed by three production units PU1, PU2, PU3 for production of first and second (different) dairy products. Recipe activities performed for production of the first and second dairy products are distinguished by subscript 1 and 2, respectively. The first dairy product may be yoghurt and the second dairy product may be standard milk. In the illustrated example, the production units PU2, PU3 are associated with a cleaning rule that mandates cleaning after each completed recipe activity for production of the first dairy product, whereas no such cleaning rule is defined for production of the second dairy product. FIG. 7A shows the sequence of recipe activities when the first dairy product is handled before the second dairy product in the respective production unit PU1-PU3. As seen, PU2 and PU3 need to be subjected to a cleaning activity, indicated by CA. Further, PU3 will have an idle or waiting period, indicated by W, while waiting for the handling of the second dairy product in PU2 to be completed. FIG. 7B shows the timing of recipe activities when the second dairy product is handled before the first dairy product. Clearly, the absence of cleaning activities enables a better utilization of the production units PU1-PU3 and also reduces the utilization of the cleaning unit(s) in the plant.

As understood from FIGS. 7A-7B, step 604/604C may generate different time schedules for a combination of PUs by varying the order of supplying dairy products, or corresponding intermediate products, to one or more PUs.

As understood from FIG. 6B, it is also conceivable that the combination of PUs is changed by step 604B to enable generation of further candidate time schedules. Consider the example in FIG. 8A, which illustrates the timing of recipe activities A10, A20 performed by two production units PU1, PU2 for production of first and second dairy products. As seen, PU2 will have an idle period, indicated by W in FIG. 8A, while waiting for the handling of the second dairy product in PU1 to be completed. In FIG. 8B, PU1 has been replaced by PU3, which is capable of performing the same recipe activity (A10) but has a higher production capacity than PU1. Thereby, the idle period W is eliminated. In FIG. 8C, PU1 of FIG. 8A has been supplemented by PU4, which is capable of performing the same recipe activity (A10) and has the same production capacity as PU1. As seen, PU4 allows for parallel handling of the first and second dairy products, and the idle period W is eliminated.

Figure 8A:
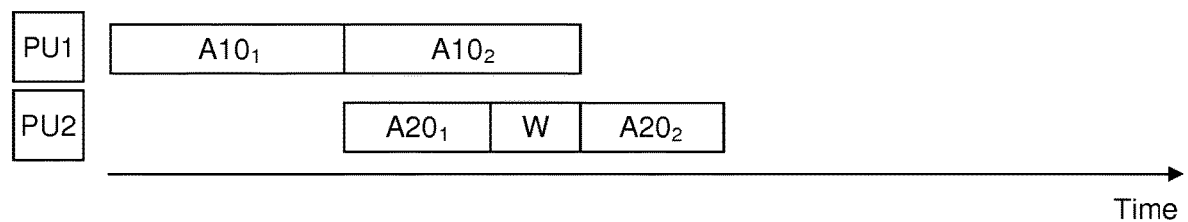
FIGS. 8A-8C illustrate changes in time schedules depending on production capacity and number of production units.
Figure 8B:
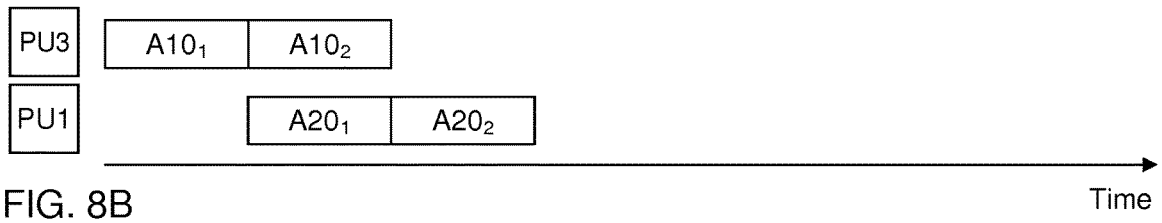
Figure 8C:
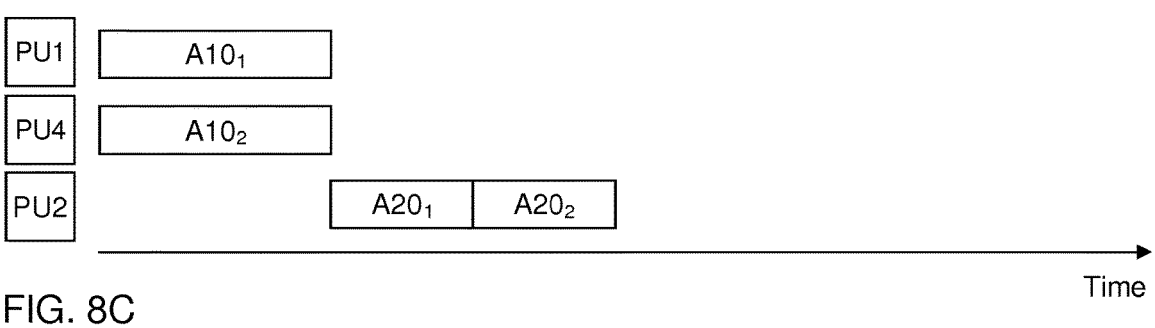

As understood from FIGS. 8A-8C, step 604B may enable step 604C to generate different candidate time schedules by changing the combination of PUs, e.g. by adding a PU to increase the number of PUs capable of performing a recipe activity and/or by replacing a PU by a corresponding PU with a different production capacity.

It is also conceivable that step 604B adds one or more PUs (tanks) for intermediate storage, even if such intermediate storage is not included in the recipe, e.g. to enable continuous processing in a downstream PU or sharing of fluid conduits and PUs between recipes. An example is seen by comparing the yoghurt recipe 500 in FIG. 5 to the material flow in FIG. 3B, where the treated milk is stored temporarily in tank T2.

The evaluation step 605 in FIGS. 6A-6B may evaluate the candidate time schedules for fulfillment of at least one evaluation constraint (cf. FIG. 4). The evaluation constraint(s) may be obtained as part of the data collection steps 601-603 or may be predefined and stored in a memory (cf. 1003 in FIG. 10). In one embodiment, the evaluation constraint defines at least one of a maximum production time required to achieve the production target, a maximum production cost and a maximum labor cost. Step 605 may thus compute a parameter value representing any of the evaluation constraints for the respective candidate time schedule and compare the parameter value to the evaluation constraint. If the production time and/or production cost and/or labor cost exceeds the evaluation constraint, step 605 may discard the candidate time schedule. The labor cost may be computed based on the amount of manual labor required to set up the PUs and/or rearrange fluid conduits during the course of the time schedule. The production cost may be computed to represent the consumption of at least one utility during the course of the time schedule, including one or more of water, energy, steam, cooling fluid, and cleaning agent.

Step 605 may also perform a forward calculation for the candidate time schedules, or at least the candidate time schedules that are found to fulfill the evaluation constraint, to verify that the production target indeed is met, given the ingredients and the delivery schedule, if specified.

Generally, steps 604-605 are performed to find one or more time schedules with high time utilization of the existing PUs in the plant, few and/or short idle periods, few product changes and few and/or short cleaning activities. Any such time schedule may be output by step 606. In addition, step 606 may output further metrics computed for each time schedule, such as total production time, CIP utilization, a graphical representation of bottlenecks, production cost, labor cost, etc.

Figure 9:
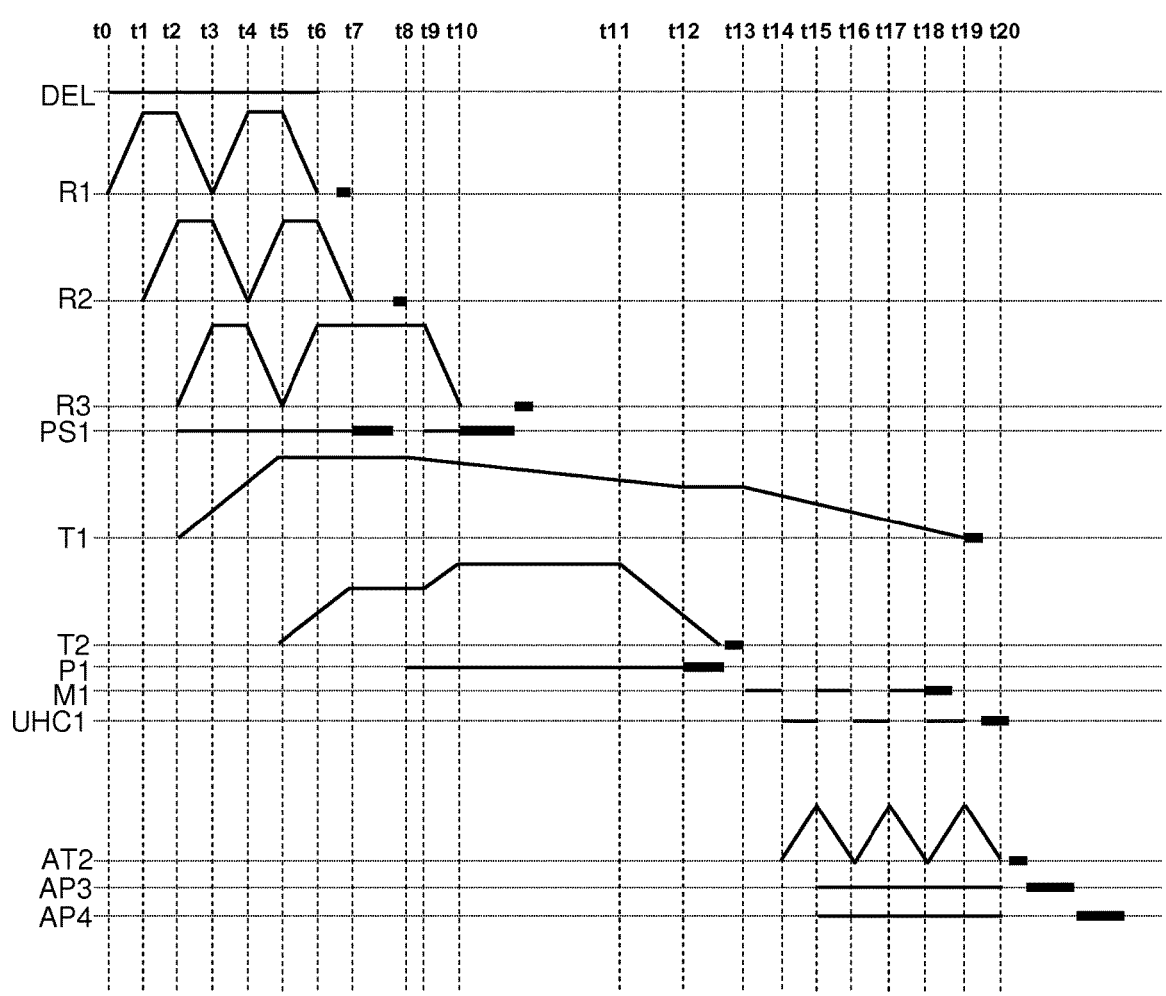
FIG. 9 is an example of a proposed time schedule generated for the production plant in FIG. 2.

FIG. 9 shows, in the form of a Gantt chart, a part of a proposed time schedule that has been generated and output by the scheduling process 600 for production of packages containing standard milk, yoghurt and chocolate milk (as well as other packaged dairy products) in the plant 10 of FIG. 2. The material flows in FIGS. 3A-3C corresponds to the time schedule of FIG. 9. Thin lines indicate periods of utilization of PUs, and thick lines indicate cleaning activities. Further, for tanks, the thin lines are drawn to represent the change in fluid volume inside the respective tank over time. The dashed vertical lines, corresponding to time points t0-t20, are merely provided to facilitate understanding of the Gantt chart by indicating start and end of various activities. As seen, the time schedule is produced to synchronize activities within the plant. It is also seen that the cleaning activities do not overlap, since there is only one CIP in the plant. At the top of FIG. 9, DEL designates a time period when milk is delivered to the plant. The illustrated part of the time schedule mainly represents the production of standard milk and chocolate milk in accordance with FIGS. 3A and 3C, although the filling and emptying of tank T2 is part of the production of yoghurt in accordance with FIG. 3B.

It is conceivable to modify the scheduling process 600 so as to enable the production plant to be updated with new PUs when the time schedules are generated in step 604. Thereby, the scheduling process may be controlled to propose a time schedule that is further improved over the time schedules that are feasible based on the existing production equipment. This functionality may be activated by user selection, or automatically, e.g. whenever the evaluation 605 fails to determine an acceptable time schedule, such as when all candidate time schedules fail to fulfill the evaluations constraint(s).

In one such embodiment, the scheduling process 600 obtains (e.g. as part of step 603) additional production unit data for selectable PUs that may be added to the production plant, where the additional production unit data associates each of the selectable PUs with one or more unit activities and a production capacity. Step 604 is modified to generate the time schedules to include recipe activities performed by one or more of the selectable PUs in a proposed arrangement in fluid communication with the existing PUs. In other words, step 604/604B is allowed to form the combinations of PUs to include one or more of the selectable PUs. With respect to the embodiment in FIG. 6B, step 604A may be modified to include also the selectable PUs, in addition to the existing PUs, among the available PUs.

It is conceivable to further modify the scheduling process 600 so as to account for the investment cost of adding one or more PUs to the plant. In one such embodiment, the scheduling process 600 obtains (e.g. as part of step 603) cost index data that associates each of the selectable PUs with a cost index. The scheduling process 600 may be further modified to compute, based on the cost index data, an investment cost index for each time schedule that includes recipe activities performed by one or more of the selectable PUs. The investment cost index may be output by step 605 together with any selected time schedule that includes a selectable PU. It is also conceivable that the time schedules are generated by step 604 so that the investment cost index is below a threshold. For example, the investment cost index may be used as a constraint for step 604B when allocating a combination of PUs. Step 604B is thereby prevented from allocating any combination that yields an investment cost index above the threshold. The threshold may be predefined or entered by the user.

In a further variant, the scheduling method 600 allows the user, e.g. by selection via a user interface, to define one or more of the selectable PUs that may be added to the plant, and optionally the proposed arrangement, i.e. where and how these selectable PUs should be added to the plant. In yet another variant, the scheduling method 600 allows the user, e.g. by selection via a user interface, to define that one or more selectable PUs should be added to the existing plant, and optionally the proposed arrangement. In these variants, the user may thus impose restrictions on the selectable PUs that are added to the existing plant. The scheduling method 600 thereby allows the user to test the impact of different modifications of the existing plant on the resulting time schedules to gain a better understanding of the existing plant and how it may be modified.

Figure 10:
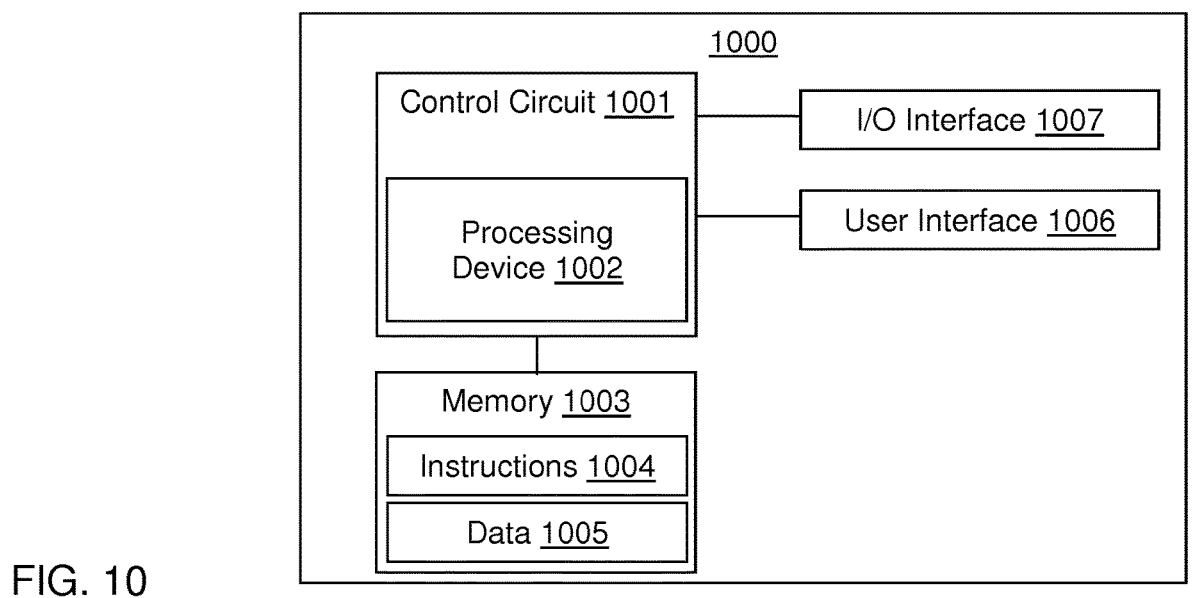
FIG. 10 is a block diagram of a device for performing scheduling processes in accordance with embodiments of the invention.

FIG. 10 is a block diagram of an example structure of a computer device 1000 for performing a scheduling process in accordance with any of the embodiments and variants described in the foregoing. In the illustrated example, the device 1000 comprises a control circuit or control unit 1001 and a memory 1003. The control circuit 1001 is responsible for the overall operation of the device 1000 and may comprise any commercially available processing device 1002, such as a CPU ("Central Processing Unit"), DSP ("Digital Signal Processor"), microprocessor or other electronic programmable logic device, or combination thereof. The control circuit 1001 may be implemented using instructions that enable hardware functionality, e.g. executable computer program instructions 1004 that may be stored on the memory 1003. The processing device 1002 may be configured to read the instructions 1004 from the memory 1002 and execute these instructions to control the operation of the device 1000, e.g. to perform any of the methods described herein. The program instructions 1004 may be provided to the device 1000 on a computer-readable medium, which may be a tangible (non-transitory) product (e.g. magnetic medium, optical disk, read-only memory, flash memory, etc) or a transitory product, such as a propagating signal.

The memory 1003 may be, for example, one or more of a buffer, a flash memory, a hard drive, a removable media, a volatile memory, a non-volatile memory, a random access memory (RAM), or other suitable device. In a typical arrangement, the memory 1003 includes a non-volatile memory for long term data storage and a volatile memory that functions as system memory for the control circuit 1001. As indicated in FIG. 10, the memory 1003 may also store data 1005 for use by the control circuit 1001, e.g. recipes 401, production unit data 402, etc. The memory 1003 may exchange data with the control circuit 1001 over a data bus. Accompanying control lines and an address bus between the memory 1003 and the control circuit 1001 may also be present. In a variant, the memory 1003 is at least partly located within the control circuit 1001.

The device 1000 further comprises a user interface (UI) 1006 for providing information or instructions to a user and/or receiving instructions from the user. For example, device 1000 may present the proposed time schedules 430, and any associated metrics, to the user via the UI 1006. The device 1000 may also obtain input data from the user via the UI 1006, e.g. as part of any one of steps 601-603. The UI 1006 may e.g. include a display, button(s), a keypad, a touchpad, a touch panel, indicator lamp(s), a microphone, a speaker, etc, or any combination thereof.

In the illustrated example, the device 1000 further comprises one or more communication interfaces 1007 for operatively connecting the device 1000 to an external device by wire or wirelessly, such as over a network. In one example, the device 1000 may retrieve data from the external device, e.g. recipes 401, production unit data 402, etc. In another example, the device 1000 may transmit the proposed time schedule(s) 430 and other output data to the external device.

The invention claimed is:

1. A computer-implemented method of scheduling production of packaged dairy products in a production plant, said method comprising:
    obtaining target production data for a plurality of dairy products to be produced and packaged in the production plant to form the packaged dairy products;
    obtaining a plurality of recipes for production of the packaged dairy products, wherein each recipe defines a set of ingredients and sequence of recipe activities for producing a respective packaged dairy product from the set of ingredients;
    obtaining production unit data that specifies existing production units in the production plant and available fluid paths between the existing production units, the production unit data further associating each existing production unit with one or more unit activities and a production capacity, the production unit data comprising one or more rules directed to cleaning of each existing production unit;
    obtaining cleaning unit data that specifies fluid paths between at least one cleaning unit (CIP) in the production plant and a plurality of the existing production units, the cleaning unit data further specifying cleaning activities performed by the at least one CIP for each existing production unit in accordance with the one or more rules;
    simulating the production of the packaged dairy products in the production plant to determine at least one time schedule that achieves the target production data said simulating comprising:
        generating, as a function of the plurality of recipes and the production unit data, a plurality of time schedules of recipe activities that are performed at least partly by one or more combinations of the existing production units to achieve the target production data;
        selecting said at least one time schedule from the plurality of time schedules by: 1) eliminating an idle period during which at least one existing production unit cannot be used; 2) changing a combination of existing production units by at least one of adding one or more existing production units or replacing a first existing production unit with a second existing production unit; and 3) reducing time duration for the cleaning activities; and
        outputting said at least one time schedule;
    determining an updated time schedule responsive to one or more modifications in the production unit data caused by an addition or replacement of one or more production units, the addition or replacement of the one or more production units being performed responsive to a determination to increase production capacity; and
    automatically running said updated time schedule in the production plant to produce the packaged dairy products and achieve the target production data.

2. The computer-implemented method of claim 1, further comprising:
    obtaining a delivery schedule of the set of ingredients, wherein the plurality of time schedules are further generated as a function of the delivery schedule of the set of ingredients.

3. The computer-implemented method of claim 1, further comprising:
    obtaining a production schedule of the packaged dairy products, wherein the plurality of time schedules are further generated as a function of the production schedule of the packaged dairy products.

4. The computer-implemented method of claim 1, wherein said generating comprises:
    comparing the recipe activities to the one or more unit activities to identify a set of existing production units that is available to perform the recipe activities;
    allocating, based on the available fluid paths and the production capacity of the set of existing production units, a combination of existing production units among the set of existing production units; and
    generating one or more time schedules of recipe activities that are performed at least partly by the combination of existing production units to achieve the target production data.

5. The computer-implemented method of claim 1, further comprising:
    obtaining at least one evaluation constraint, wherein the selecting comprises evaluating the plurality of time schedules for fulfillment of the at least one evaluation constraint.

6. The computer-implemented method of claim 5, wherein the at least one evaluation constraint defines at least one of: a time required to achieve the target production data, a production cost or a labor cost.

7. The computer-implemented method of claim 6, wherein the production cost is represented by consumption of at least one utility, including one or more of water, energy, steam, cooling fluid, or cleaning agent.

8. The computer-implemented method of claim 1, further comprising:
    obtaining additional production unit data for selectable production units to be added to the production plant, the additional production unit data associating each of the selectable production units with one or more unit activities and a production capacity, wherein the plurality of time schedules are further generated to include recipe activities performed by one or more of the selectable production units in a proposed arrangement in fluid communication with the existing production units.

9. The computer-implemented method of claim 8, further comprising obtaining a user selection of one or more of the selectable production units or said proposed arrangement.

10. The computer-implemented method of claim 8, further comprising:
    obtaining cost index data that associates each of the selectable production units with a cost index; and
    computing, based on the cost index data, an investment cost index for each time schedule that includes recipe activities performed by one or more of the selectable production units.

11. The computer-implemented method of claim 10, wherein the plurality of time schedules are generated so that the investment cost index is below a threshold.

12. The computer-implemented method of claim 1, wherein the generating and selecting are performed iteratively as part of an optimization process.

13. The computer-implemented method of claim 1, wherein the existing production units comprise one or more of a tank, a mixer, a filling machine, a package distribution equipment, a packaging line, a separator, a homogenizer, a heat treatment unit, or a heat exchanger.

14. A non-transitory computer-readable medium comprising computer instructions which, when executed by a processing device, cause the processing device to perform a method in accordance with claim 1.

15. A device for scheduling production of packaged dairy products in a production plant, said device comprising a processing device being configured to perform a method in accordance with claim 1.

16. The computer-implemented method of claim 1, wherein the at least one CIP is the sole CIP in the production plant, and wherein selecting the at least one time schedule specifies that the cleaning activities performed by the at least one CIP for each existing production unit do not overlap.

17. The computer-implemented method of claim 1, wherein:
  the one or more rules directed to cleaning each existing production unit comprise, for a particular existing production unit:
    a first duration of a first cleaning process;
    a second duration of a second cleaning process, the second duration being longer than the first duration; and
    a number consecutive first cleaning processes permitted before a second cleaning process is needed; and
  the at least one time schedule specifies that the at least one CIP cleans the particular existing production unit in accordance with the one or more rules.

18. The computer-implemented method of claim 1, wherein changing the combination of existing production units comprises adding one or more tanks for intermediate storage of a component utilized during production of the plurality of dairy products, thereby enabling continuous production of the plurality of dairy products.

19. The computer-implemented method of claim 18, wherein the component comprises treated milk.

\* \* \* \* \*